United States Patent
Stepanov et al.

(10) Patent No.: US 8,141,586 B2
(45) Date of Patent: Mar. 27, 2012

(54) FLUID CONTROL

(75) Inventors: Eugene V. Stepanov, Osseo, MN (US);
Douglas P. Goulet, Hanover, MN (US);
John Hunter, Rogers, MN (US)

(73) Assignee: Control Components, Inc., Rancho Santa Margarita, CA (US)

( * ) Notice: Subject to any disclaimer, the term of this patent is extended or adjusted under 35 U.S.C. 154(b) by 597 days.

(21) Appl. No.: 12/441,200

(22) PCT Filed: Sep. 14, 2007

(86) PCT No.: PCT/GB2007/003480
§ 371 (c)(1),
(2), (4) Date: Apr. 23, 2009

(87) PCT Pub. No.: WO2008/032078
PCT Pub. Date: Mar. 20, 2008

(65) Prior Publication Data
US 2010/0001213 A1    Jan. 7, 2010

(30) Foreign Application Priority Data
Sep. 15, 2006 (GB) .................................. 0618166.3

(51) Int. Cl.
*F16K 3/34* (2006.01)
(52) U.S. Cl. ..................... 137/625.33; 138/42
(58) Field of Classification Search ........ 137/625.33–625.39; 138/42; 366/340
See application file for complete search history.

(56) References Cited

U.S. PATENT DOCUMENTS

| 3,434,500 | A | 3/1969 | Burrows | |
|---|---|---|---|---|
| 3,917,221 | A | 11/1975 | Kubota et al. | |
| 3,954,124 | A * | 5/1976 | Self | 138/42 |
| 6,615,874 | B2 * | 9/2003 | Thurston et al. | 138/42 |
| 6,718,633 | B1 * | 4/2004 | Glenn et al. | 29/890.124 |
| 6,926,032 | B2 * | 8/2005 | Nawaz | 137/625.33 |
| 7,044,437 | B1 * | 5/2006 | Martin | 251/127 |
| 8,033,300 | B2 * | 10/2011 | Mccarty | 138/42 |

FOREIGN PATENT DOCUMENTS

| EP | 1180627 | 2/2002 |
|---|---|---|
| WO | WO 01/84029 | 11/2001 |
| WO | WO 2004/106792 | 12/2004 |

OTHER PUBLICATIONS

Written Opinion for PCT/GB2007/003480.

* cited by examiner

*Primary Examiner* — John Fox
(74) *Attorney, Agent, or Firm* — Stetina Brunda Garred & Brucker

(57) ABSTRACT

A valve having a trim comprising a plurality of impingement flowpaths, each flowpath comprising a central impingement chamber and having three radially directed inlet passages is provided. As the fluid floes through the inlet passages and enters the impingement chamber the flow starts to turn and impinge upon one another at a substantially central point within the impingement chamber and exit together via the outlet which is substantially axial to the impingement chamber. As the flows entering the impingement chamber impinge on one another as opposed to a wall of the flowpath, the impingement can be used to create a flowpath with reduced erosion.

20 Claims, 6 Drawing Sheets

FLUID CONTROL

CROSS-REFERENCE TO RELATED APPLICATIONS

The present application claims priority to International Application No. PCT/GB2007/003480 which was filed on Sep. 14, 2007 and claims priority to Great Britain Patent Application No. 0618166.3 filed on Sep. 15, 2006.

STATEMENT RE: FEDERALLY SPONSORED RESEARCH/DEVELOPMENT

Not Applicable

BACKGROUND OF THE INVENTION

1. Technical Field of the Invention

This invention relates to the control and reduction of fluid pressure in control valves, especially but not exclusively severe service valves for use in power industries and oil and gas wells.

2. Description of the Related Art

The technology most widely used in severe service valves utilizes pressure letdown chambers consisting of one or more flow passages containing multiple orifice openings, labyrinths, or multiple, abrupt angular turn, passageways resulting in a staged pressure reduction. Alternatively, flow restrictions can be afforded by providing in the flow passage a region of reduced cross sectional area through which the fluid passes. As the fluid flows through the flow passage, the velocity is locally increased in that region thereby generating turbulence which dissipates energy and reduces the pressure.

In the afore-mentioned control valves, dissipation of the energy of the flowing fluid is effected by frictional drag through tortuous passages or by successive abrupt contractions and expansions through smooth passages. Both of these types of valve work well for clean fluids but in a number of applications the fluid will contain contaminants, for example solid particles or droplets of liquid, which will cause the passages to erode quickly. This is especially prevalent in the tortuous passage type which promotes the collision of particles with the passage walls, thereby accelerating erosion, and in expansion/contraction valves as the contraction has an associated acceleration and the energy dissipated through the physical flow restrictions can result in physical damage or erosion to valve components if not controlled in a careful manner. The problem of erosion is particularly prevalent in well head choke valves, which are the primary shut-off/control valve on the top of an oil or gas well head. As this valve is immediately atop the well head there is no possibility of removing contaminants prior to them entering the valve.

A solution to the aforementioned problem is disclosed in our co-pending UK Patent Application number 0618165. While this is a very effective solution, the cost of ceramics needed in higher erosion solutions can be substantial, hence it is advantageous to effect the maximum pressure reduction in the most compact configuration possible, thus the higher fluid resistance a valve trim has the better.

The present invention attempts to mitigate problems with existing valves by providing a compact control valve with increased erosion resistance.

BRIEF SUMMARY OF THE INVENTION

According to a first aspect of the invention there is provided a valve trim for a pressure reduction valve, the trim comprising a plurality of high flow resistance flowpaths therethrough, each flowpath comprising an impingement chamber having at least three substantially radially directed fluid inlet passages arranged at its circumference, and at least one substantially axial outlet, said passages being arranged such that, in use, fluid entering the impingement chamber from each inlet passage impinges on the fluid entering the impingement chamber from the other inlet passages and thereafter fluid exits the chamber through said outlet.

Thus, any particles in the fluid flow give up a large amount of their energy as the fluid flows mutually impinge, thereby resulting in reduced erosion of the walls of the flowpath. The configuration is especially effective at reducing pressure in a very small volume and reducing erosion due to dry particles within the fluid flow. Therefore it is especially advantageous in these conditions where expensive ceramic or other exotic materials are often used as the volume of material can be kept to a minimum. The present invention is most effective when used for single phase gas flows and offers increased pressure reduction compared to the aforementioned patent application. If multi-phase flows are used (i.e. gas/liquid mixtures) then the present invention still effects very good pressure reduction characteristics but will have reduced erosion resistance. Where the dominant fraction of a multiphase is liquid then it would be preferable to use the valve trim disclosed in our aforementioned co-pending patent application.

By providing at least three flowpaths entering the impingement chamber a significantly more stable impingement can be established that when using two impinging flowpaths. By way of its three inlets the impingement zone is less likely to drift off centre over time thereby imparting long term stability to the performance of the valve trim. When only two impingement flowpaths are used, if there is any erosion of the inlet flowpath causing the angle at which the fluid enters the impingement chamber to vary slightly then the two flows entering the chamber will no longer be aligned and as a result only a partial impingement will occur resulting in only a fraction of the energy being dissipated. In addition the part of the flows that do not impinge on one another will instead impinge at full speed on the wall of the impingement chamber thereby accelerating erosion. In the present invention, if there is erosion of one of the inlets to the impingement chamber then the flows will still all impinge on one another but the forces at the impingement will be slightly out of balance. This will not result in erosion as it would with only two inlets, rather the impingement zone becomes slightly larger and may have a very small resulting vortex at its centre.

In addition the higher the number of flows that impinge at one point, the greater the efficiency over a tortuous path type valve trim, i.e. three 90° bends have been replaced by one flow-on-flow impingement.

Preferably the impingement chamber is substantially cylindrical and is equal to, or larger, in diameter than the outlet such that even if the impingement zone becomes enlarged as described above there is minimal contact of the flow with the walls of the impingement chamber. Alternatively the impingement chamber may be polygonal, for example square or hexagonal. Where the impingement chamber is polygonal the fluid inlet passages are radially directed in relation to the incircle of the polygon.

Preferably the at least three inlet passages have a substantially 90 degrees bend upstream of the impingement chamber. The 90 degree bend creates a resistance to flow and by placing one inline in the inlet passage prior to the impingement chamber the pressure within the impingement chamber is further reduced thereby further decreasing erosion within the impingement chamber. In addition the use of 90° bends allows the flow to be channeled and ensures that the direction of the flow entering the impingement chamber is free from the influence of the general direction of the flow at the inlet to the valve trim and also allows the impingement chamber to be placed perpendicularly to the input direction of the flow thereby enabling the benefit of material efficiency of having perpendicularly oriented impingement chambers.

Preferably the valve trim is substantially tubular in form and said plurality of flowpaths pass through it. The flow through the valve trim preferably flows into the exterior circumferential surface and exits at the internal circumferential surface.

Preferably the trim comprises an inner element and an outer element, said inner and outer elements being substantially tubular in form. Preferably the outer circumferential surface of the inner element is substantially in contact with the inner circumferential surface of the outer element.

Preferably the impingement chambers and inlet passages of each high resistance flowpath are at least partially formed in the outer circumferential surface of the inner element and an axial outlet passes from the impingement chamber through the inner element exiting at its interior circumferential surface.

Preferably a passageway is formed through the outer element leading to, and associated with, each of the at least three inlets passages. More preferably, and for the purpose referred to above, a substantially 90 degree bend in the inlet passage is formed by the passageway and associated inlet passage.

In one preferred arrangement the inner circumferential surface of the outer element encloses an open end of the impingement chamber formed in the outer circumferential surface of the inner element. In an alternative preferred arrangement the impingement chamber of each high resistance flowpath is at least partially formed in the inner circumferential surface of the outer element. In both embodiments the impingement chambers and flowpaths are preferably machined into the surfaces of said substantially tubular elements.

Preferably the inner tubular element is of a ceramic material. Ceramic materials are particularly suitable as they can be very hard and have good wear properties. Preferably the ceramic material is a metal compound ceramic, for example a metal boride, nitride or carbide. Particularly suitable are tungsten carbides and aluminum magnesium borides. Alternatively the trim may be of other materials of a suitable hardness, for example zirconium, in particular partially stabilized zirconium. The metal compound ceramics may comprise a single compound or a mixture of substances, for example a doping element may be added to increase the wear characteristics of the ceramic, for example a Group 3, 4 or 5 element or a nitride or boride thereof. Particularly suitable is $TiB_2$.

In one preferred arrangement the outer tubular element is metal. In an alternative preferred arrangement the inner and outer tubular elements are both of a ceramic material.

According to a second aspect of the invention there is provided a valve having a trim according to the first aspect of the invention.

According to a third aspect of the invention there is provided a method of manufacturing a valve trim according the first aspect of the invention and having an inner tubular element of a ceramic material and a metallic outer tubular element, the method comprising the steps of:

forming the elements such that the outer diameter of the inner element is larger than the inner diameter of the outer element;

machining the impingement chambers and associated inlet passages into the external cylindrical surface of said inner element while the ceramic material is in its green state, and forming radial fluid flow passageways in the outer element;

heating the metal outer element causing it to expand such that it expands allowing the inner element to be positioned inside it;

aligning the passageways through the outer element and the inlet passages; and allowing the outer element to cool and contract around the inner element thereby creating an interference fit between the two elements and thus joining them together.

In one preferred arrangement, prior to fitting the inner element inside the outer element, the inner element is fired to harden the green ceramic material. More preferably, after the ceramic is hardened and prior to fitting the inner element inside the outer element, the outer surface of the inner element is ground to give the inner element the required external diameter.

In an alternative preferred arrangement, after fitting the inner element inside the outer element the valve trim is fired to harden the ceramic inner layer.

According to a fourth aspect of the present invention there is provided a valve having a trim manufactured according to the third aspect of the invention.

According to a fifth aspect of the invention there is provided a method of manufacturing a valve trim according to the first aspect of the invention and having inner and outer tubular elements of a ceramic material comprising the steps of:

forming the inner and outer elements such that the outer diameter of the inner element is larger than the inner diameter of the outer element;

machining the impingement chambers and associated inlet passages into the external cylindrical surface of said inner element and forming radial fluid flow passageways in the outer element while the ceramic material is in its green state;

cooling the inner element causing it to contract thereby allowing it to be positioned inside the outer element;

aligning the passageways through the outer element and the inlet passages; and allowing the inner sleeve warm and expand thereby creating an interference fit between the two elements and thus joining them together.

In one preferred arrangement, after joining the two elements together they are fired to harden the green ceramic material. In an alternative preferred arrangement the elements are fired prior to joining them together. Where the elements are fired prior to joining them together the inner surface of the outer element and the outer surface of the inner element are preferably ground to give the joining faces of the two elements the required diameters.

According to a sixth aspect of the present invention there is provided a valve having a trim manufactured according to the fifth aspect of the invention.

BRIEF DESCRIPTION OF THE DRAWINGS

Specific embodiments of the invention will now be described, by way of example only, with reference to the accompanying drawings in which.

DETAILED DESCRIPTION OF THE INVENTION

Figure 1:
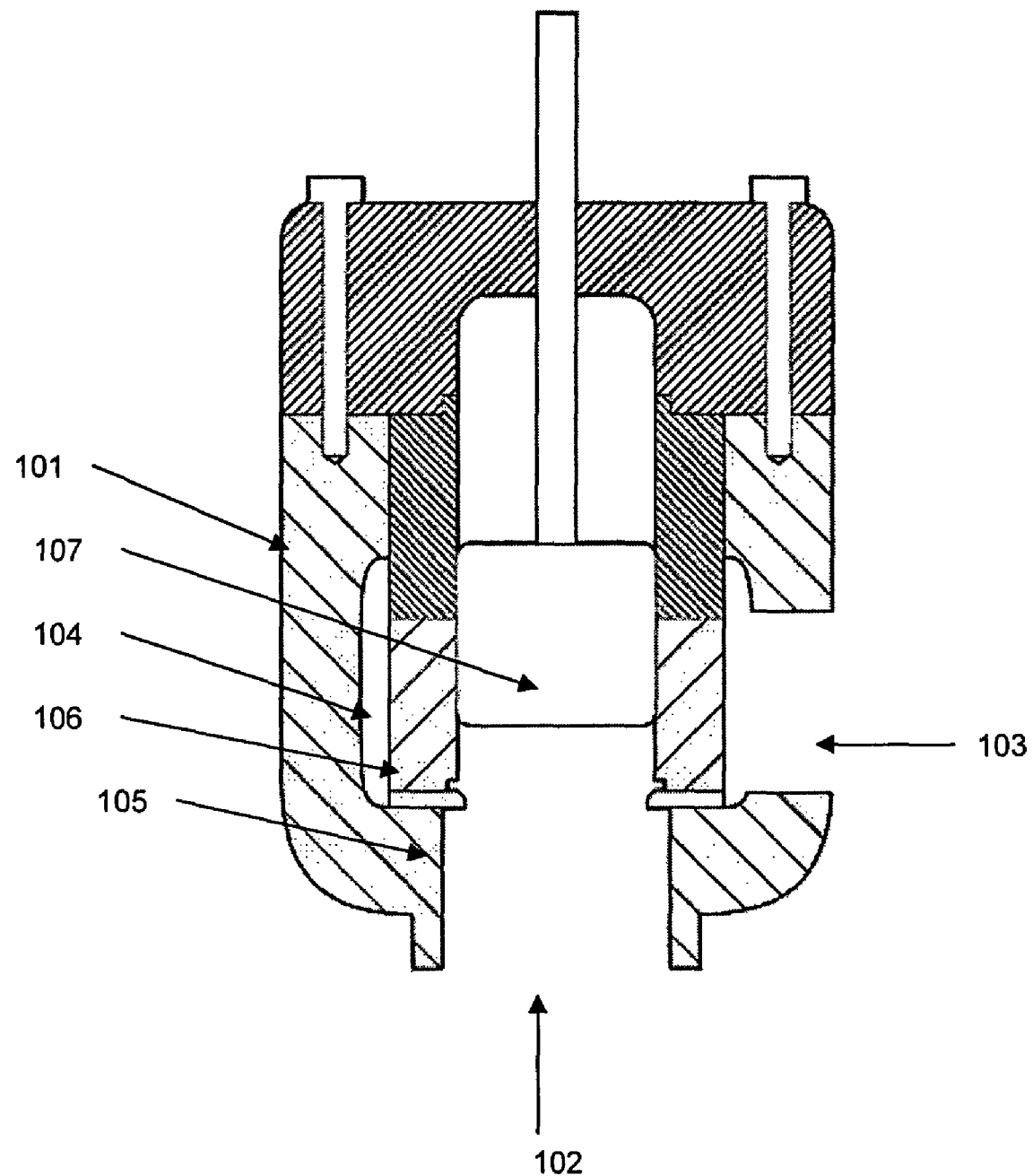
FIG. 1 is a vertical section showing the construction of a control valve incorporating a valve trim as common in the art.

Referring to FIG. 1 an example of a valve trim in a fluid control valve is shown as common in the art comprising a valve body 101 with an inlet 102 and outlet 103 in fluid communication with one another via a central chamber 104 containing seat ring 105, valve trim 106 and plug 107. When the valve plug 107 sits on the valve seat ring 105 no flow is permitted to pass through the valve. As the plug 107 is lifted in a controlled movement, flow is allowed to enter the valve through inlet 102 and passes through the valve trim 106, which reduces the fluid pressure, and out of outlet 103.

The trim 106 has a plurality of flowpaths therethrough which have a resistance to flow.

Figure 2:
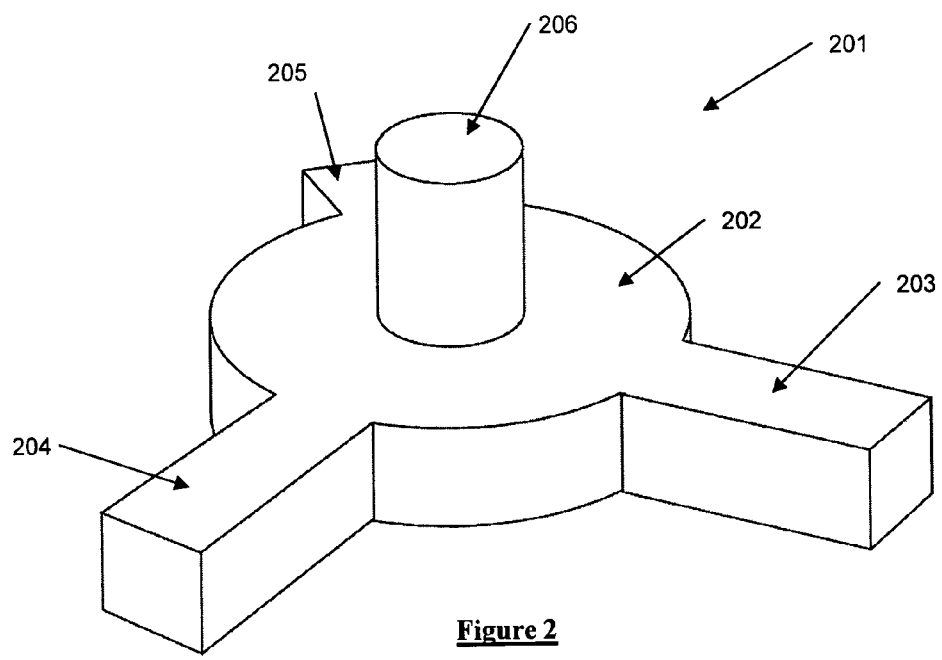
FIGS. 2 and 3 show impingement flowpaths for a valve trim according to the invention.

Referring to FIG. 2 a impingement flowpath 201 is shown comprising a central impingement chamber 202 and having three radial inlet passages 203, 204, 205. As the fluid flows through the inlet passages 203, 204, 205 and enters the impingement chamber 202 the flows start to turn and impinge upon one another at a substantially central point within the impingement chamber and exit together via the outlet 206 which is substantially axial to the impingement chamber. The outlet 206 may be any diameter up to the diameter of the impingement chamber 202.

Figure 3:
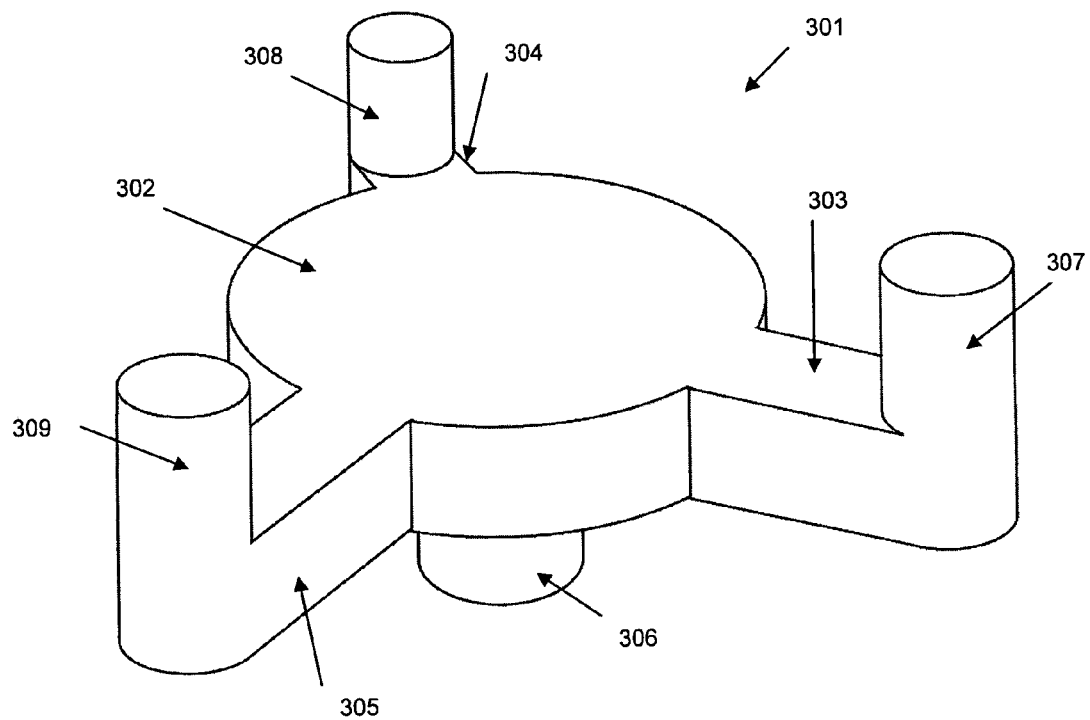

Referring to FIG. 3 a flowpath 301 is shown comprising a impingement chamber 302 into which three substantially radial inlets 303, 304, 305 open. The arrangement of the inlets to the impingement chamber is as described above with reference to FIG. 2. Prior to entering the impingement chamber 302 fluid flows through passageways 307, 308, 309 and turns through 90 degrees as it enters the inlet passages 303, 304, 305. As with reference to FIG. 2 the flow within the impingement chamber 302 impinges and then exits via the axial outlet 306.

Figure 4:
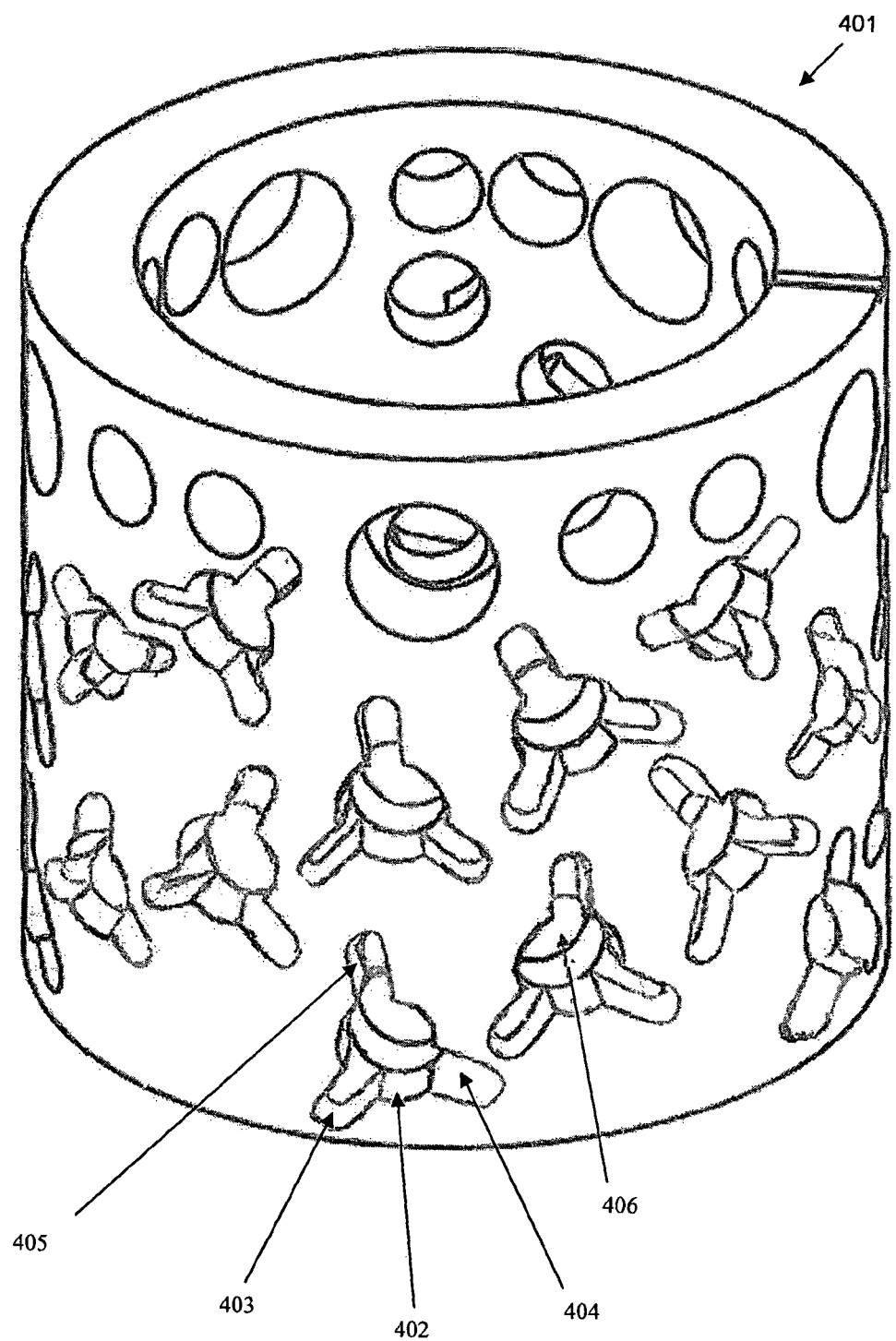
FIG. 4 shows an interior element of a valve trim according to the invention.
Figure 5:
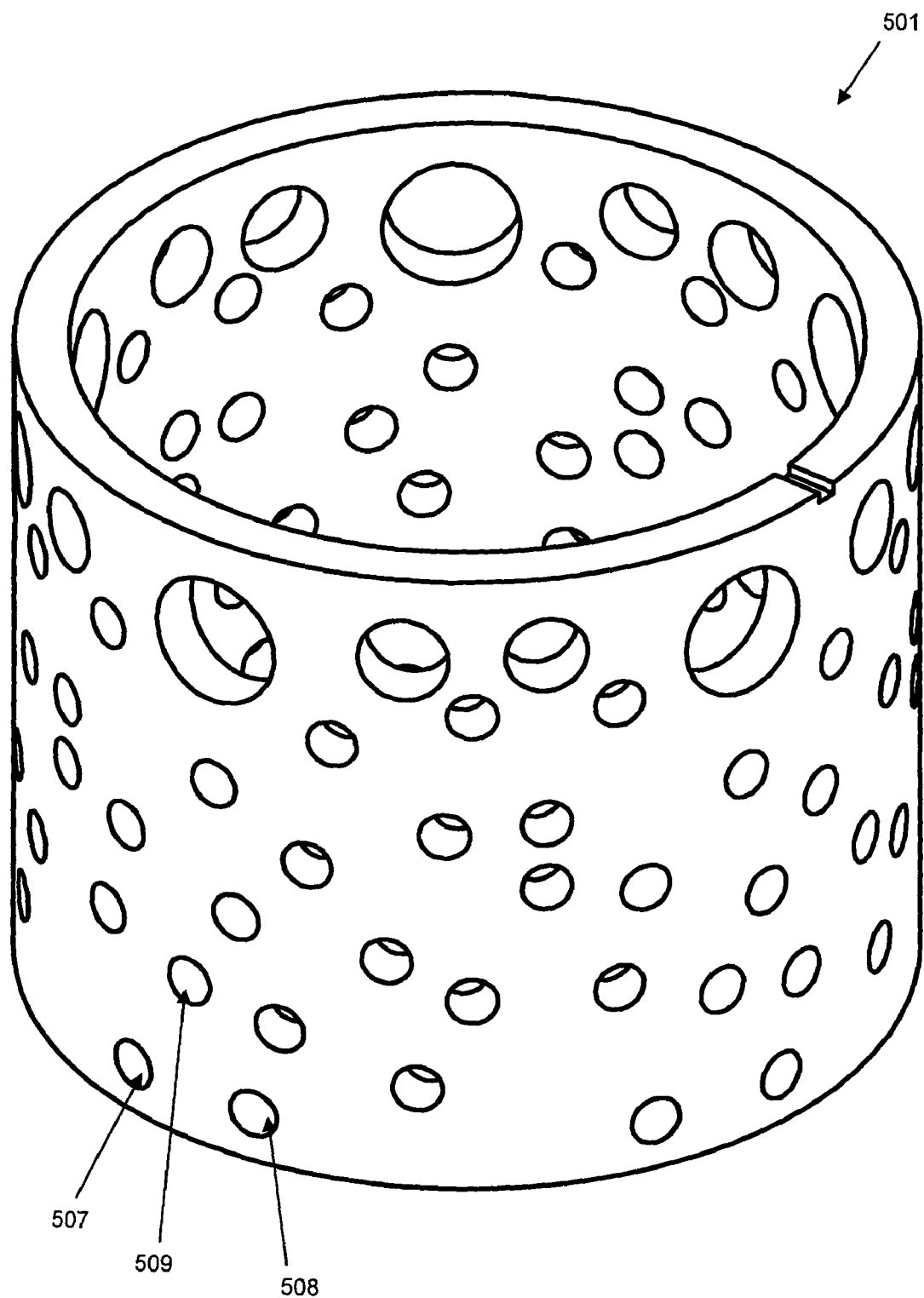
FIG. 5 shows an exterior element of a valve trim according to the invention.
Figure 6:
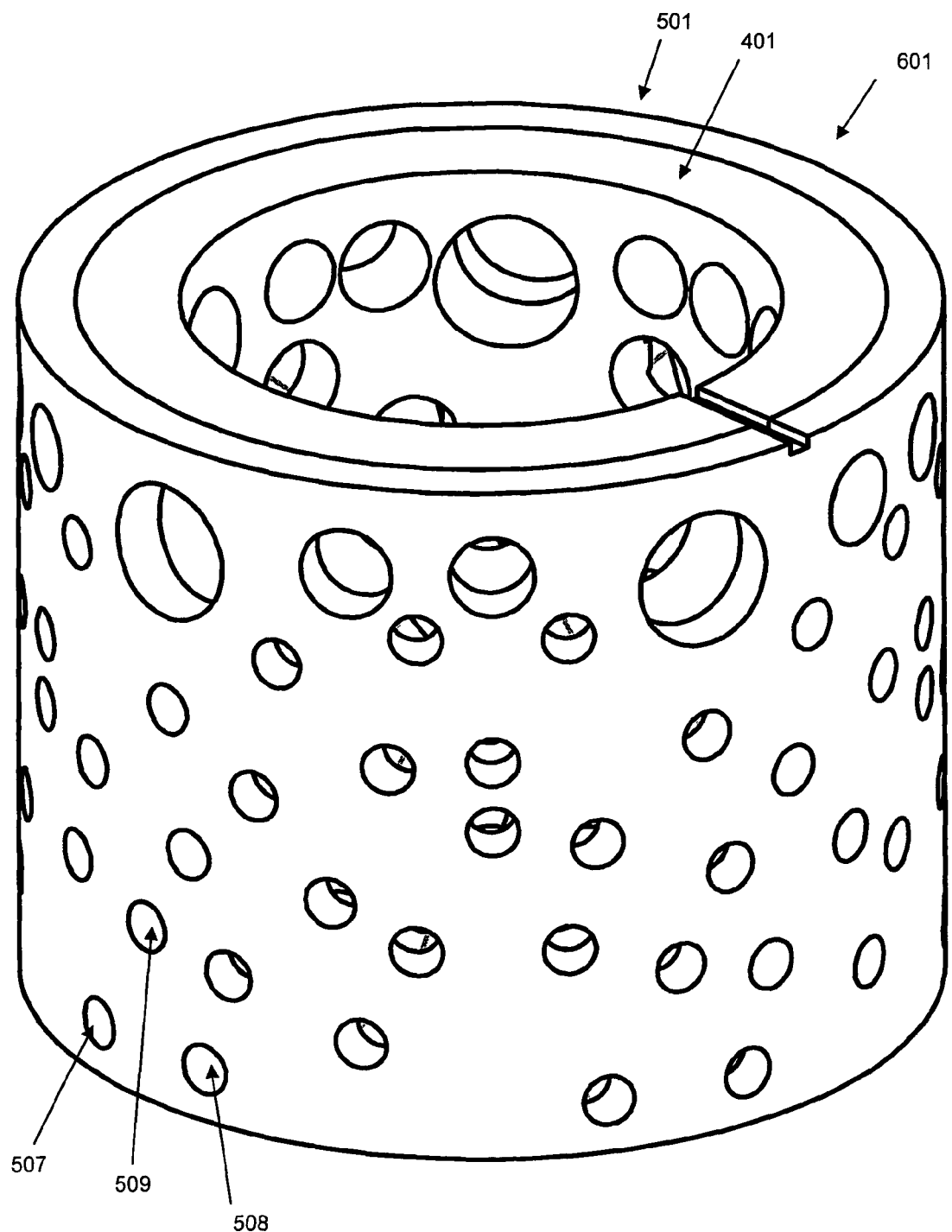
FIG. 6 shows an assembled view of a valve trim according to the invention.

Referring to FIGS. 4 to 6 a tubular inner element (401, FIG. 4) and a tubular outer element (501, FIG. 5) of a valve trim are shown. The inner element 401 has a plurality of impingement chambers 402 and associated inlets 403, 404, 405 machined into its outer surface. Extending from the centre of each impingement chamber through the inner element 401 to open at its interior surface is an outlet 406. The outer element 501 has a plurality of sets of passageways 507, 508, 509 extending through it such that if the inner element 401 were placed inside the outer element 501 the passageways 507, 508, 509 would align with the ends of the inlet passages 403, 404, 405 such that fluid entering the passageways 507, 508, 509 would pass through the outer element 501 and turn through 90 degrees to enter the inlet passages 403, 404, 405 prior to entering the impingement chamber 402 where they impinge on one another and exit through the inner element 401 via the outlet 406 axially to the impingement chamber. The inner element is made of material which is naturally hard in nature and thus has good wear properties. Ceramics in particular are suitable and particularly suitable are metal compound ceramics, for example a metal boride, nitride or carbide; amongst, these tungsten carbides and aluminum magnesium borides are preferred. When used, metal compound ceramics may comprise a single compound or a mixture of substances, for example a doping element may be added to increase the wear characteristics of the ceramic, for example a Group 3, 4 or 5 elements or a nitride or boride thereof. Particularly suitable is $TiB_2$. As an alternative to metal compound ceramics other materials of a suitable hardness may be used, for example zirconium, in particular partially stabilized zirconium. The outer element 501 may be of a similar material as the inner element 401 or, as the majority of the erosion occurs in the impingement chamber 402 within the inner element 401 the outer element 501 may be of a softer material, for example metal. Preferably the impingement chambers 402, inlet passages 403, 404, 405, and the outlets 406 are machined into the inner element 401. The impingement chambers 402 and inlet passages 403, 404, 405 are machined into the exterior surface of the inner element 401 such that they create recesses therein and the outlet 406 is machine from the centre of the impingement recess through the element such that fluid may flow therethrough. The sets of passageways 507, 508, 509 are machined through the outer element. When ceramics are being used the machining of the inner and outer elements to create the flowpaths is done when the ceramic is in its green state, i.e. before the ceramic has been hardened, so that conventional tools can be used.

Once the inner 401 and outer 402 elements have been manufactured they can be assembled together to form a valve trim 601. Depending on the materials being used this can be done either when the ceramic is in its green state or after it has been fired to harden it.

The inner 401 and outer 501 elements are manufactured such that the interior diameter of the outer element 501 is marginally smaller than the exterior diameter of the inner element 401 such that under normal conditions it is not possible to insert the inner element 401 into the outer element 501. To enable this to occur, if both parts are ceramic, the inner element 401 is cooled to cause it to contract. As the inner diameter of the outer element 501 is only marginally smaller than the outer diameter of the inner element 401 as the inner element 401 contracts it becomes possible to locate it inside the outer element 501. The elements 401, 501 are then aligned so that the passageways 507, 508, 509 are aligned with the inlet passages 403, 404, 405 and the assembled valve trim is allowed to warm up. As the inner element 401 warms it expands and contacts the outer element 501 whereby an interference fit is created between the two. Where both the inner 401 and outer 501 elements are of ceramic materials there are two alternative methods of assembly of the valve trim. The first method involves hardening the ceramic before assembly and the second involves hardening the ceramic after assembly. If the elements are hardened before assembly then it may be necessary to grind the external surface of the inner element 401 and the internal surface of the outer element 501 to the required dimensions for a good interference fit. When the valve trim is fired after assembly to harden the ceramic it is not necessary to grind the mating surfaces as the ceramic of the two components is softer and will conform to one another as the inner element 401 expands into contact with the outer element 501. The ceramic of the two elements fuses during the firing process.

When the inner element 401 is a ceramic and the outer element 501 is a metal then the process is slightly different. In this case the inner element 401 is fired to harden the ceramic and once hardened is then ground to give the required external dimension.

The outer element 501 is then heated thereby causing it to expand such that its inner diameter becomes larger than the outer diameter of the inner element 401. The inner element is placed within the outer element and they are then aligned so that the passageways 507, 508, 509 are aligned with the inlet passages 403, 404, 405 and the assembled valve trim is allowed to cool. As it cools the metal outer element contracts and an interference fit is affected between the inner and outer elements.

In both arrangements, i.e. with a metal or a ceramic outer element 501, a chamfer may be provided on both the end of both the inner 401 and the outer 501 elements to assist the insertion of one within the other.

In both arrangements, i.e. with a metal or a ceramic outer element 501, a witness mark may be provided at the end of both the inner 401 and the outer 501 elements to assist alignment of one within the other.

Although the valve trim is described as being manufactured in two parts, it could comprise three parts, i.e. an external element having sets of passageways therethrough, a central element having a impingement chamber and associated inlet passages extending therethrough and an inner element having the outlet extending therethrough.

Figure 7:
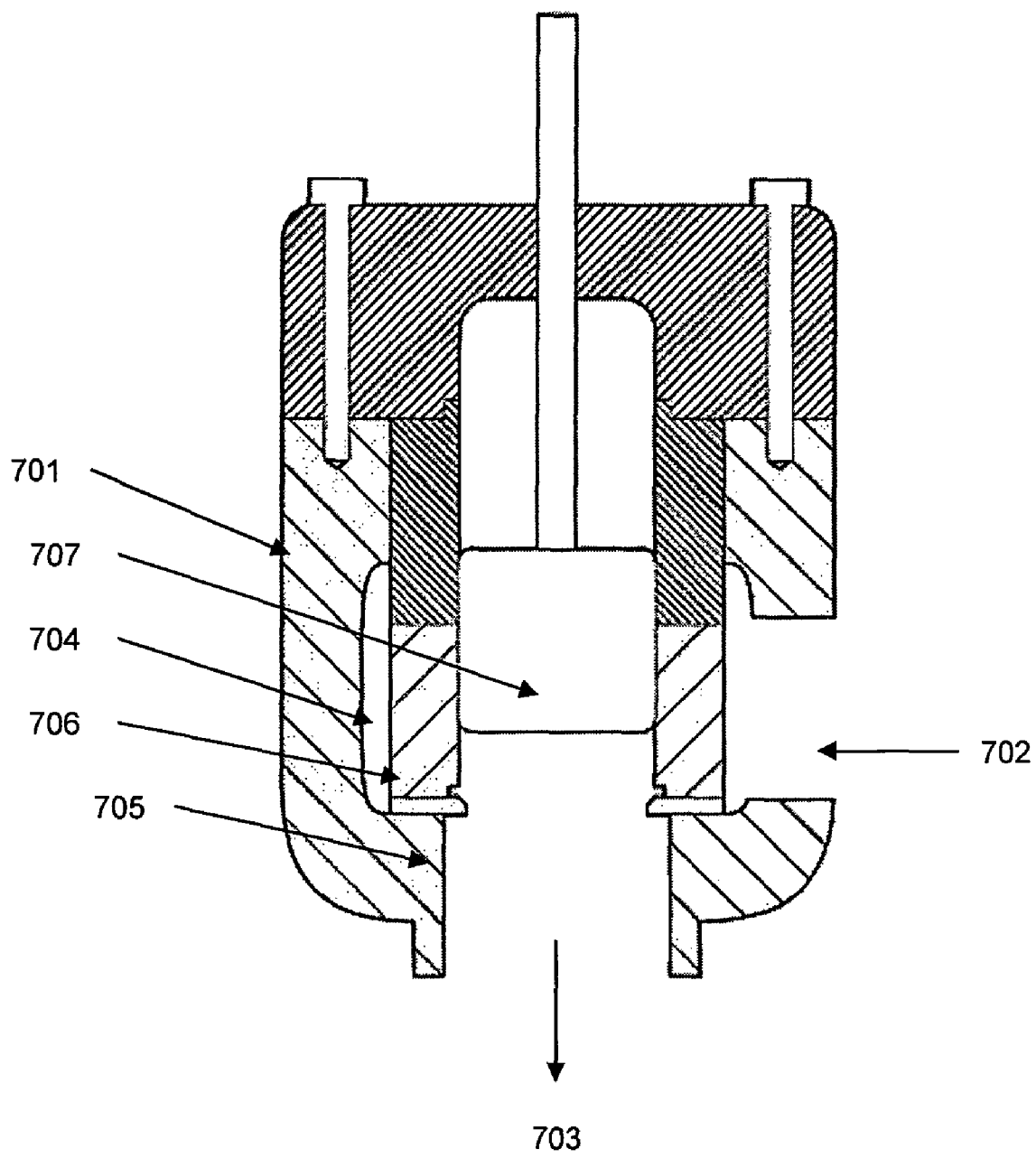
FIG. 7 shows a cross section of a valve according to the invention.

Referring to FIG. 7 a fluid control valve with a trim as described above is shown. The valve comprises a valve body 701 with a inlet 702 and outlet 703 in fluid communication with one another via a central chamber 704 containing seat ring 705, valve trim 706 and plug 707. When the valve plug 707 sits on the valve seat ring 705 no flow is permitted to pass through the valve. As the plug 707 lifts up in a controlled movement flow is allowed to enter the valve through inlet 702 and passes through the exposed flowpaths of the valve trim 706, which reduces the fluid pressure with minimum erosion, and out of outlet 703. The trim 706 has a plurality of flowpaths therethrough as described above with relation to FIGS. 2 to 4 and is constructed as described in relation to FIGS. 4 to 6.

It will be understood that the invention is not limited to the embodiment described above and that various modifications and changes can be made within the scope of the following claims.

The invention claimed is:

1. A valve trim for a pressure reduction valve, the trim comprising an inner element and an outer element, said inner and outer elements being substantially tubular in form and collectively defining a plurality of high flow resistance flowpaths therethrough, each flowpath comprising an impingement chamber having at least three substantially radially directed fluid inlet passages arranged at its circumference, and at least one substantially axial outlet, said passages being arranged such that, in use, fluid entering the impingement chamber from each inlet passage impinges on the fluid entering the impingement chamber from the other inlet passages and thereafter fluid exits the chamber through said outlet.

2. A valve trim according to claim 1 wherein the chamber is substantially cylindrical.

3. A valve trim according to claim 1 wherein each of the inlet passages has a substantially 90 degree bend upstream of the impingement chamber.

4. A valve trim according to claim 1 wherein the inner element defines an outer circumferential surface and the outer element defines an inner circumferential surface, the outer circumferential surface of the inner element being substantially in contact with the inner circumferential surface of the outer element.

5. A valve trim according to claim 1 wherein the inner element and the outer element each define a respective inner circumferential surface and a respective outer circumferential surface, the inlet passages and the impingement chamber of each high resistance flowpath being at least partially formed in the outer circumferential surface of the inner element and an axial outlet passes from the impingement chamber through the inner element exiting at its inner circumferential surface.

6. A valve trim according to claim 5 wherein a passageway is formed through the outer element leading to, and associated with, each of the at least three inlet passages.

7. A valve trim according to claim 5 wherein the inner circumferential surface of the outer element encloses an open end of the impingement chamber formed in the outer circumferential surface of the inner element.

8. A valve trim according to claim 5 wherein the impingement chamber of each high resistance flowpath is at least partially formed in the inner circumferential surface of the outer element.

9. A valve trim according to claim 5 wherein the impingement chambers and inlet passages are machined into the surfaces of said substantially tubular elements.

10. A valve trim according to claim 5 wherein the inner tubular element is of a ceramic material and the outer tubular element is of a metal.

11. A valve trim according to claim 10 wherein the ceramic is $AlMgB_{14}$.

12. A valve trim according to claim 5 wherein the inner and outer tubular elements are both of a ceramic material.

13. A valve trim according to claim 12 wherein the ceramic contains a doping agent selected from the group including: Group 3, 4 and 5 elements and nitrides and borides thereof.

14. A valve trim according to claim 13 wherein the doping agent is $TiB_2$.

15. A method of manufacturing a valve trim having an inner tubular element and an outer tubular element collectively defining a plurality of high flow resistance flowpaths through the inner tubular element and the outer tubular element, each flowpath comprising an impingement chamber having at least three substantially radially directed fluid inlet passages arranged at its circumference, and at least one substantially axial outlet, said passages being arranged such that, in use, fluid entering the impingement chamber from each inlet passage impinges on the fluid entering the impingement chamber from the other inlet passages and thereafter fluid exists the chamber through said outlet, the method comprising the steps of:

forming the inner tubular element out of a ceramic material and the outer tubular element out of a metallic material, the inner tubular element having an external cylindrical surface defining an outer diameter being larger than an inner diameter defined by the outer tubular element;

machining the impingement chambers and associated inlet passages into the external cylindrical surface of said inner tubular element while the ceramic material is in its green state, and forming radial fluid flow passageways in the outer tubular element;

heating the metal outer tubular element causing it to expand such that it expands allowing the inner tubular element to be positioned inside it;

aligning the passageways through the outer tubular element and the inlet passages; and allowing the outer tubular element to cool and contract around the inner tubular element thereby creating an interference fit between the two elements and thus joining them together.

16. The method according to claim 15 wherein prior to fitting the inner tubular element inside the outer tubular element, the inner tubular element is fired to harden the ceramic.

17. The method according to claim 15 wherein after fitting the inner tubular element inside the outer tubular element the valve trim is fired to harden the ceramic inner layer.

18. A method of manufacturing a valve trim having an inner tubular element and an outer tubular element collectively defining a plurality of high flow resistance flowpaths through the inner tubular element and the outer tubular element, each flowpath comprising an impingement chamber having at least three substantially radially directed fluid inlet passages arranged at its circumference, and at least one substantially axial outlet, said passages being arranged such that, in use, fluid entering the impingement chamber from each inlet passage impinges on the fluid entering the impingement chamber from the other inlet passages and thereafter fluid exists the chamber through said outlet, the method comprising the steps of:

forming the inner tubular element and the outer tubular element out of a ceramic material, the inner tubular element having an external cylindrical surface defining an outer diameter being larger than an inner diameter defined by the outer tubular element;

machining the impingement chambers and associated inlet passages into the external cylindrical surface of said inner tubular element and forming radial fluid flow passageways in the outer tubular element while the ceramic material is in its green state;

cooling the inner tubular element causing it to contract thereby allowing it to be positioned inside the outer tubular element;

aligning the passageways through the outer tubular element and the inlet passages; and warming the inner tubular element causing the inner tubular element to expand thereby creating an interference fit between the two elements and thus joining them together.

19. The method according to claim 18 further comprising the step of:

firing the two elements after they have been joined together to harden the green ceramic material.

20. The method according to claim 18 further comprising the step of:

firing the inner tubular element and the outer tubular element prior to joining them together to harden the green ceramic material.

\* \* \* \* \*